Patented Dec. 1, 1925.

1,564,142

UNITED STATES PATENT OFFICE.

CARL GUSTAV SCHWALBE, OF EBERSWALDE, GERMANY.

UTILIZING SULPHITE CELLULOSE LYE.

No Drawing. Application filed October 17, 1924. Serial No. 744,254.

*To all whom it may concern:*

Be it known that I, CARL GUSTAV SCHWALBE, a citizen of the Free State of Prussia, in the German Republic, residing at Eberswalde, in the Free State of Prussia, Germany, have invented Improvements in Utilizing Sulphite Cellulose Lye; and I do hereby declare the following to be a full, clear, and exact description of the same.

My invention relates to a new method of utilizing sulphite cellulose lye.

Heretofore several ways have been proposed for utilizing the lye from sulphite cellulose, and among other suggestions it has also been proposed and attempted to utilize the large amounts of waste lye available in cellulose factories as a valuable fuel. But this cannot be done without previously carbonizing the carbonizable constituents of the lye. In the methods, however, hitherto suggested for the purpose high pressure must be applied and the apparatus required to this end are comparatively too expensive so that the process is not economical the less so since large quantities of acid are required at the same time to carry the process into effect.

After much study and research I have found that high pressures are not absolutely necessary and that a sufficient carbonization can be ensured at a low pressure of about 5 to 8 atmospheres, if the sulphite cellulose lye is mixed with certain mineral salts, preferably magnesium chloride, sodium chloride and calcium chloride, and the mass under treatment is heated to a temperature between 150° and 200° C. preferably to about 170° to 180° C. The organic matter then can be separated from the liquor in the form of a very fine powder consisting of carbon.

In order to facilitate the separation by filtration it is advisable to give the sulphite cellulose lye an addition of finely comminuted wood, bark and the like, preferably saw-dust and wood chips which likewise carbonize when treated in the manner described. The relatively large surface areas afforded by such additional matter cause the extremely fine carbon particles which are to be separated from the lye, to adhere thereto and to thus be absorbed thereby so that they will readily separate from the liquid constituents of the lye. The salt solution recovered by the filtering process can be used again. Instead of employing metallic chlorides also solution thereof such as condensed sea water or potassium mother liquor may be used.

*Example.*—400 parts by weight of waste sulphite cellulose lye condensed by evaporation to 100 parts by weight and 300 parts by weight of concentrated potassium mother lye—magnesium chloride lye containing some magnesium sulfate—are mixed together and 400 parts by weight of saw-dust are added thereto. The mass is thoroughly mixed by stirring and heated to a temperature of 180° C. in a suitable vessel for about ten hours so that part of the volatile constituents of the mixture, amounting approximately to one fourth of the volume of the lye, will evaporate and the pressure will rise to about six atmospheres.

The pressure then is reduced to normal and the pulpy mass consisting of carbonaceous matter and a salt solution is treated in a filtering apparatus for the purpose of separating the solid carbonaceous matter from the salt solution. To this end a certain quantity of water may be added to the pulpy mass, if required, in order to facilitate filtration. The solid residue thus obtained is subjected to a drying operation and when dry the same is adapted to be utilized for heating a boiler or the like.

The salt solution recovered by the filtering process is reduced to its original concentration by means of evaporation. If it is desired to avoid initial inspissation and to employ original sulphite cellulose lye, 400 parts by weight of hot sulphite cellulose lye, 400 parts by weight of the salt solution and 400 parts by weight of wood chips or saw-dust are mixed together and the thus obtained mixture is deprived, by distillation, of so much water that the stated concentration is ensured.

In the operation of heating the mixture of sulphite lye, salt solution and saw-dust or wood chips acid vapors, such as sulfurous acid and some hydrochloric acid are developed, so that part of the sulfurous acid may be recovered. It is advisable to add mineral acids to the mixture of sulphite cellulose lye, salt solution and comminuted wood or bark, and in doing so the recoverable quantities of developed sulfurous acid, acetic acid, wood-spirit and the like are obviously enhanced.

From the foregoing it is believed, that the advantages and novel features of my invention will be readily understood and, therefore, further detail description is deemed unnecessary. It will be evident, however, that my invention, whilst being adhered to in its main essentials, may be varied and adapted in many ways, according to the requirements desired or most suitable under different circumstances.

What I claim is:—

1. A method of utilizing sulphite cellulose lye, consisting in mixing sulphite cellulose lye with chlorides of magnesium, calcium or sodium and heating the mixture under pressure to a temperature between 150° and 200° C.

2. A method of utilizing sulphite cellulose lye, consisting of mixing sulphite cellulose lye with potassium mother liquor or condensed sea-water and heating the mixture under pressure to a temperature between 150° and 200° C.

3. A method of utilizing sulphite cellulose lye, consisting in mixing the sulphite cellulose lye with chloride of magnesium, calcium or sodium and with vegetable waste, such as wood chips, saw-dust, comminuted bark and the like, and heating the mixture under pressure, to a temperature between 150° and 200° C. substantially as and for the purpose set forth.

4. A method of utilizing sulphite cellulose lye, consisting in mixing the sulphite cellulose lye with chlorides of magnesium, calcium or sodium, vegetable waste, such as wood chips, saw-dust, comminuted bark and the like, adding a mineral acid or acids to the mixture, and heating the mixture under pressure to a temperature between 150° and 200° C. substantially as and for the purpose set forth.

CARL GUSTAV SCHWALBE.